Aug. 5, 1969  M. GREEN ET AL  3,459,458
TRACTOR BRAKING SYSTEMS
Filed Jan. 16, 1968  2 Sheets-Sheet 1

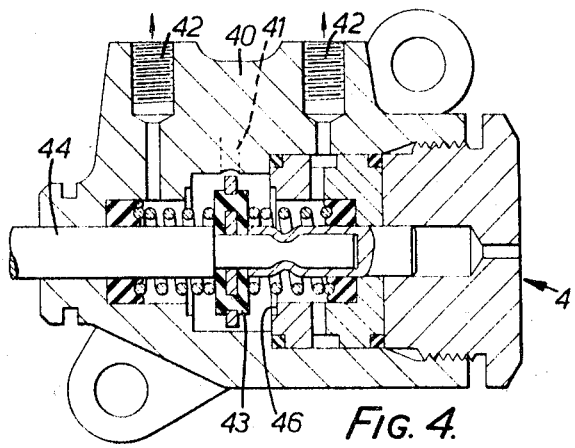
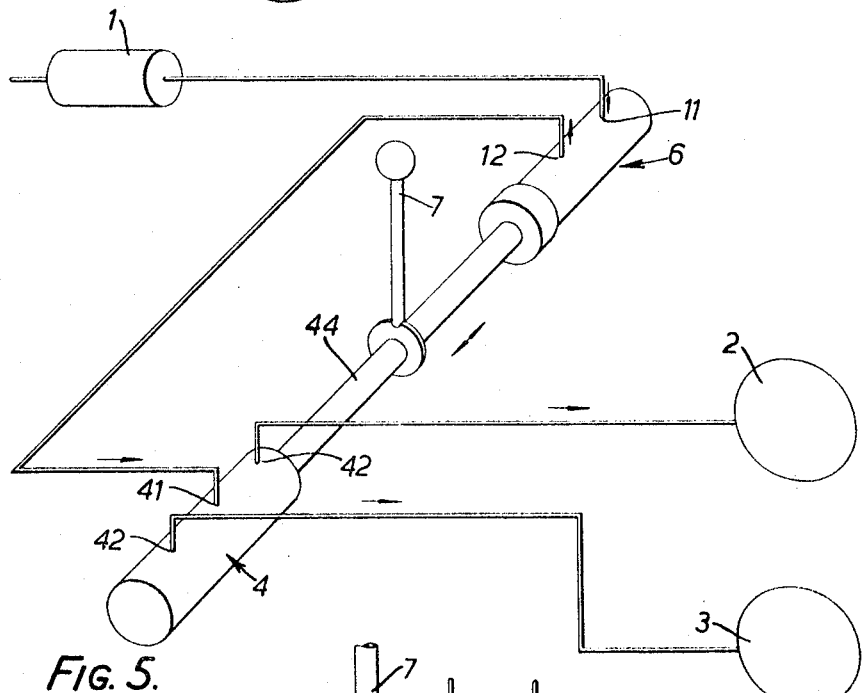
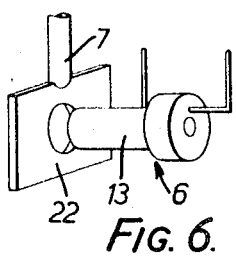

United States Patent Office 3,459,458
Patented Aug. 5, 1969

3,459,458
TRACTOR BRAKING SYSTEMS
Martin Green and Roy Campbell, Birmingham, England, assignors to Girling Limited
Filed Jan. 16, 1968, Ser. No. 698,235
Claims priority, application Great Britain, Jan. 16, 1967, 2,140/67
Int. Cl. B60t 13/00, 11/10, 17/02
U.S. Cl. 303—6                                                 4 Claims

ABSTRACT OF THE DISCLOSURE

The invention resides in an improvement in tractor braking systems of the type in which a selector valve is used to transmit braking pressure either to both of a pair of wheel brakes, for normal braking, or to either brake alone, for brake assisted steering. The invention employs a pressure control valve which co-operates with the selector valve so as to transmit a higher pressure when brake assisted steering is required than when normal braking is required, thereby to reduce the effort required from the driver for a given braking force when effecting steering manoeuvres. The control valve can be a booster valve or a reducer valve. If the former, the control valve is normally inoperative but is rendered operative when brake-assisted steering is to be effected, if the latter, it is rendered inoperative for brake-assisted steering. Preferably, there is a simple mechanical linkage between the pressure control valve and a manual operating lever for the selector valve.

---

This invention relates to tractor braking systems in which wheels on opposite sides of a tractor are differentially operable to assist steering manoeuvres.

In the tractor braking systems of this general form and of which we are at present aware, the pressure transmitted to the wheel brakes for differential braking is the same as that transmitted for normal braking. However, in the course of an operation such as ploughing, the driver may have to execute a large number of brake assisted turns in a relatively short space of time, and this can be a cause of significant additional fatigue.

The present invention has for its object the provision of an improved tractor braking system which enables the fatigue resulting from repeated brake-assisted turns to be reduced.

In accordance with the invention, there is provided a tractor braking system, comprising a source of fluid under pressure, a pressure control valve and a brake selector valve, both connected in a pressure line between the source of pressure and a pair of wheel brakes, and means responsive to operation of the selector valve in selecting one brake only of the pair to render the pressure transmitted by the control valve.

In each of the preferred forms of the invention which are described below, there is a simple mechanical connection between a manually operated lever of the selector valve and the control valve, thereby simplifying manufacture and installation as compared with any possible hydraulic or electro-mechanical interaction which could, however, be employed within the broad scope of the invention.

The control valve may take the form of a booster valve which is normally open to transmit fluid pressure without intensification thereof, but which automatically comes into operation to provide an increased pressure when the selector valve is operated. Alternatively, the control could be a reducer valve which normally acts to transmit a reduced pressure to the brakes, but is caused to transmit the pressure without reduction when the selector valve is operated.

Some constructional forms of the invention will now be described, by way of example only, with reference to the accompanying drawings, in which:

FIGURE 4 is an axial section of a suitable selector valve;

FIGURE 5 is a diagrammatic view of the layout incorporating the valves of FIGURES 3 and 4; and FIGURE 6 is a scrap diagrammatic view of a possible modification of the system of FIGURE 1.

In the drawings, corresponding parts of the different embodiments have the same reference numerals.

Figure 1:
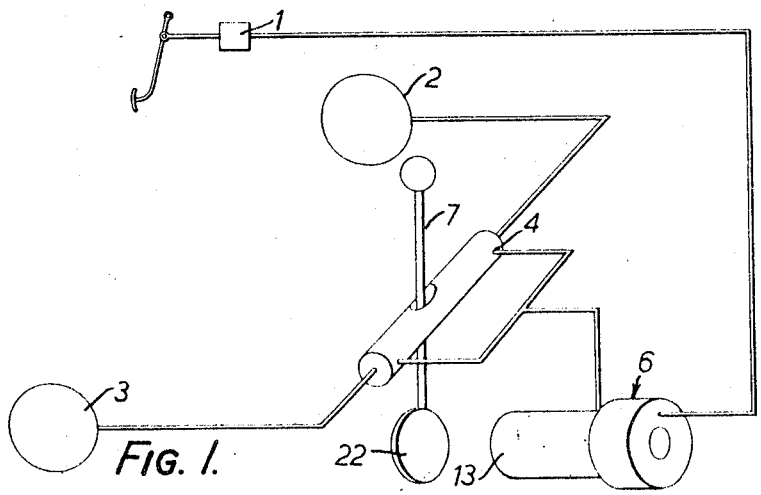
FIGURE 1 is a diagrammatic perspective view of a tractor braking system in accordance with the invention.

The system shown in FIGURE 1 comprises a pedal operated master cylinder 1 for operating a pair of wheel brakes 2 and 3. Connected in the pipe line between the master cylinder and the wheel brakes is a brake selector valve 4 and a pressure control valve 6. The selector valve 4 has an operating lever 7 which in its centre, neutral position allows the valve to pass fluid to both brakes 2 and 3 equally. Movement of the lever to either side causes fluid to be directed to only one or other of the brakes for selective (or differential) braking.

Figure 2:
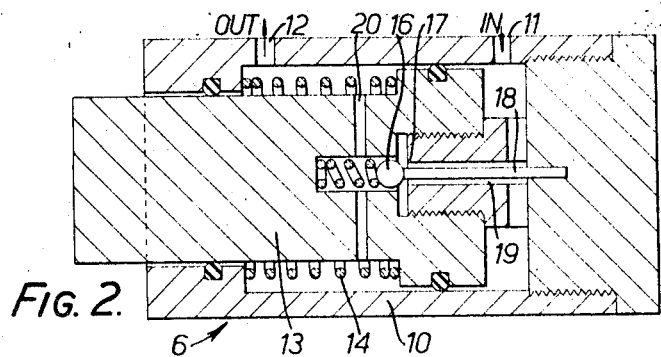
FIGURE 2 is an axial section of the pressure control valve.

As shown in FIGURE 2, the pressure control valve comprises a cylinder body 10 having an inlet 11 and outlet 12, and a stepped piston 13 slidably sealed in the cylinder and with its end portion of smaller diameter projecting through one end of the body 10.

The piston is biased to its extreme right-hand position, as shown, by a compression spring 14, and in this position a valve-ball 16 is held off a co-operating seat 17 by a valve stem 18, as to allow the flow of fluid through communicating axial and radial passages 19 and 20 from the inlet to the outlet.

Upon actuation of the brake system, the inlet pressure increases until the piston is moved outwardly (to the left) against the action of the spring 14, allowing the valve-ball 16 to close on its seat 17 and close the passage through the piston. Thereafter, the pressure transmitted by the control valve is increased in the ratio of the stepped piston areas.

This pressure increase is, however, only required for selective braking of one wheel-brake only, and for normal actuation of both brakes, outward movement of the piston 13 is blocked by a disc-like abutment 22 carried by the selector valve lever 7. Only when the lever is moved away from its central position can the control valve act as a booster valve, to provide increased fluid pressure at the selected brake. The abutment 22 could alternatively be formed by a plate with holes in it.

Figure 3:
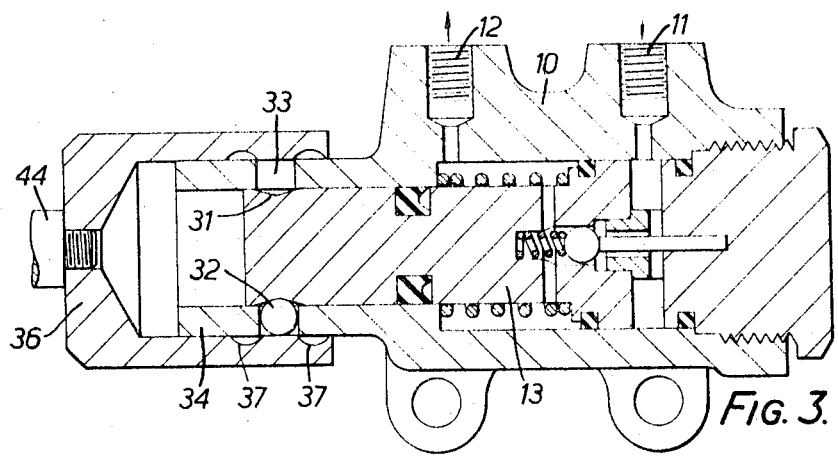
FIGURE 3 is an axial section of a second form of pressure control valve.

In the second illustrated form of the invention, shown in FIGURES 3, 4 and 5, the pressure control valve 6 incorporates means for locking the piston in its normal position, the said means being coupled to the selector valve to release the piston upon actuation of the selector valve.

The valve is shown in FIGURE 3, and is generally similar to that of FIGURE 2. However, the piston 13 is formed with an annular recess 31 for co-operation with a ball or balls 32 located in bores 33 in a tubular extension 34 of the valve body. An abutment or sleeve 36 slidably mounted on the extension 34 is formed with two spaced annular recesses 37.

In the illustrated position, the balls 32 are maintained by the sleeve in locking engagement with the piston, which is thereby locked against axial movement. Displacement of the sleeve to the left or right will allow the balls to move outwardly into one of the recesses 37, thus freeing the piston.

The sleeve is coupled to the operating shaft of the selector valve, which is illustrated in FIGURE 4. The selector valve comprises a body 40 formed with a centre inlet 41 (indicated in dotted line) and two outlets 42 to the respective wheel brakes. A disc valve 43 is carried by the operating shaft 44 for co-operation with either of two axially spaced valve seats 46. It will be seen that movement of the valve 43 against either seat will shut off the adjacent outlet and cause flow through the valve to be directed through the other outlet.

FIGURE 5 illustrates schematically the general layout of the system.

In a modified form of the embodiment of FIGURE 1, the booster control valve is replaced by a reducer control valve 6 which is normally operative to transmit a reduced pressure to both brakes, but is prevented from acting as a reducer valve when selective braking is required. In this case, the abutment 22 on the operating lever 7 is normally clear of the valve piston 13 in that it has a central hole normally in register with the piston, but the abutment 22 is moved into the path of the piston for selective braking.

We claim:

1. In a tractor braking system, a source of fluid under pressure, a pair of wheel brakes, conduit means connecting said brakes to said source, a pressure control valve interposed in said conduit means and having one operative condition in which it transmits pressure at one rate and a second operative condition in which it transmits pressure at a higher rate, a selector valve interposed in said conduit means in series with said control valve and having a manual operating lever movable between a neutral position in which said selector valve connects both brakes to said source, a first extreme position in which pressure is transmitted to one only of said brakes, and a second extreme position in which pressure is transmitted to only the other of said brakes, and abutment means movable with said lever and co-operating with said control valve to select said second condition of said control valve in response to positioning of said lever in either of said extreme positions.

2. A tractor braking system as claimed in claim 1, wherein said control valve includes a valved piston movable to vary the rate at which pressure is transmitted through said control valve, and said abutment means is adapted to be moved into and out of the path of said piston.

3. A tractor braking system according to claim 1, wherein said control valve includes a valve body and a valved piston movable relative to said body to vary the rate at which pressure is transmitted by said control valve, said system further including locking means selectively operable to lock said piston relative to said valve body, and means responsive to movement of said abutment means to engage and disengage said locking means.

4. In a tractor braking system, a source of fluid under pressure, a pair of wheel brakes, a fluid pressure responsive pressure control valve having first and second operative conditions in which it transmits braking pressure at respective first and second rates, said second rate being higher than said first rate, a brake selector valve, means operatively connecting said valves in series between said source and said brakes, said selector valve being selectively operable to connect both or either one of said brakes to said source, and means responsive to operation of said selector valve for selection of one only of said brakes to change said control valve from said first condition to said second condition.

References Cited

UNITED STATES PATENTS 2,317,753  4/1943  Garelli _____ 303—6
2,373,450  4/1945  Boldt _____ 303—6 XR

FOREIGN PATENTS 365,455  1/1932  Great Britain.

MILTON BUCHLER, Primary Examiner
JOHN J. McLAUGHLIN, JR., Assistant Examiner

U.S. Cl. X.R.
180—6; 188—152; 303—13